US009680970B2

(12) United States Patent
Wu et al.

(10) Patent No.: US 9,680,970 B2
(45) Date of Patent: Jun. 13, 2017

(54) SYSTEM AND METHODS FOR COMMUNICATING BETWEEN AN IMPLANTABLE MEDICAL DEVICE AND AN EXTERNAL DEVICE

(71) Applicant: Pacesetter, Inc., Sunnyvale, CA (US)

(72) Inventors: Yongjian Wu, Saratoga, CA (US); Jun Yang, Valencia, CA (US); Balakrishnan Shankar, Oxnard, CA (US); Chao-Wen Young, Cupertino, CA (US); Reza Shahandeh, Thousand Oaks, CA (US)

(73) Assignee: Pacesetter, Inc., Sunnyvale, CA (US)

( * ) Notice: Subject to any disclaimer, the term of this patent is extended or adjusted under 35 U.S.C. 154(b) by 557 days.

(21) Appl. No.: 14/108,125

(22) Filed: Dec. 16, 2013

(65) Prior Publication Data
US 2015/0172423 A1 Jun. 18, 2015

(51) Int. Cl.
*H04L 29/06* (2006.01)
*A61N 1/372* (2006.01)
(Continued)

(52) U.S. Cl.
CPC .......... *H04L 69/08* (2013.01); *A61N 1/37252* (2013.01); *H04L 29/06068* (2013.01); *H04W 84/20* (2013.01); *H04W 88/16* (2013.01)

(58) Field of Classification Search
CPC .................................. A61N 1/00; A61B 19/00
(Continued)

(56) References Cited

U.S. PATENT DOCUMENTS

| 5,626,630 A * | 5/1997 | Markowitz | .......... A61B 5/0031 |
| | | | 128/903 |
| 5,755,745 A * | 5/1998 | McGraw | ............ A61N 1/36014 |
| | | | 607/48 |

(Continued)

FOREIGN PATENT DOCUMENTS

EP 2 139 555 B1 5/2013

OTHER PUBLICATIONS

"ZL70102 Medical Implantable RF Transceiver MICS RF Telemetry." Data Sheet, Revision 2, pp. 1-69. May 2012, Microsemi Corporation.
(Continued)

*Primary Examiner* — Christopher D Koharski
*Assistant Examiner* — Roland Dinga
(74) *Attorney, Agent, or Firm* — Theresa A. Raymer (57) ABSTRACT

A method is provided for a bridge device to interface between an external device and an implantable medical device ("IMD"), the bridge device includes a system on a chip ("SoC") having a memory, an input/output interface, a standard wireless computer network ("SWCN") controller and a bridge controller integrated into a single integrated circuit ("IC"). The method includes configuring the bridge controller to convert data between a Medical Implant Communication Service (MICS) protocol and a SWCN protocol, coupling a MICS controller to the SoC, and configuring the MICS controller to manage operation of a first transceiver based on the MICS protocol. The method includes configuring the SWCN controller to manage operation of a second transceiver based on the SWCN protocol, communicating between the bridge device and an IMD utilizing the first transceiver, and communicating between the bridge device and an external device utilizing the second transceiver.

19 Claims, 4 Drawing Sheets

(51) Int. Cl.
*H04W 88/16* (2009.01)
*H04W 84/20* (2009.01)

(58) Field of Classification Search
USPC ..................................... 607/32, 60; 128/899
See application file for complete search history.

(56) References Cited

U.S. PATENT DOCUMENTS

| | | |
|---|---|---|
| 7,623,922 B2 | 11/2009 | Bange et al. |
| 7,904,169 B2 | 3/2011 | Bange et al. |
| 8,046,079 B2 | 10/2011 | Bange et al. |
| 8,185,204 B2 | 5/2012 | Bange et al. |
| 8,373,556 B2 | 2/2013 | LaLonde et al. |
| 8,433,420 B2 | 4/2013 | Bange et al. |
| 2005/0061336 A1 | 3/2005 | Goetz et al. |
| 2007/0049992 A1* | 3/2007 | Freeberg ............ A61N 1/37211 607/60 |
| 2008/0015655 A1 | 1/2008 | Bange et al. |
| 2008/0015656 A1 | 1/2008 | Bange et al. |
| 2008/0228237 A1 | 9/2008 | Bange et al. |
| 2009/0018623 A1* | 1/2009 | Levinson ................ A61F 7/10 607/96 |
| 2009/0058635 A1 | 3/2009 | LaLonde et al. |
| 2009/0062887 A1 | 3/2009 | Mass et al. |
| 2012/0065697 A1 | 3/2012 | Bange et al. |
| 2012/0209353 A1 | 8/2012 | Bange et al. |
| 2013/0079836 A1 | 3/2013 | Srivastava et al. |
| 2013/0085550 A1* | 4/2013 | Polefko ............. A61N 1/37252 607/59 |

OTHER PUBLICATIONS

"ZL70120 MICS-Band RF Base Station Module (BSM)," Datasheet, Revision 4, pp. 1-34, Feb. 2013, Microsemi Corporation.

Bradley, Peter D. "An Ultra Low Power, High Performance Medical Implant Communication System (MICS) Transceiver for Implantable Devices." Zarlink Semiconductor, Biomedical Circuits and Systems Conference, 2006. BioCAS 2006.

"2.4-GHz Bluetooth TM low energy and Proprietary System-on-Chip." Texas Instruments, SWRS110D—Jan. 2012—Revised Jun. 2013. pp. 1-32. 2012-2013 Texas Instruments.

* cited by examiner

SYSTEM AND METHODS FOR COMMUNICATING BETWEEN AN IMPLANTABLE MEDICAL DEVICE AND AN EXTERNAL DEVICE

BACKGROUND

Embodiments of the present invention generally relate to implantable medical devices, and more particularly to communicating between implantable medical devices and external devices.

An implantable medical device ("IMD") is a medical device that is configured to be implanted within a patient anatomy and commonly employ one or more leads with electrodes that either receive or deliver voltage, current or other electromagnetic pulses (generally "energy") from or to an organ or tissue for diagnostic or therapeutic purposes. In general, IMDs include a battery, electronic circuitry, such as a pulse generator and/or a processor module, that are hermetically sealed within a metal housing (generally referred to as the "can"), and a microprocessor that is configured to handle RF communication with an external device, as well as control patient therapy.

IMDs are programmed and monitored by an external programmer or external home-based patient care system. RF circuitry and an antenna are embedded within the housing of the external programmer and base station to allow data communication with the IMD. For example, a patient may have an IMD that communicates with a base station within the patient's home or a programmer that is used by physicians to change settings within the IMD and/or retrieve data from the IMD. The base station or external programmer device receives data from the IMD about the patient's physiological state. For example, the IMD may transmit stored data or sensed physiological parameters to the base station. Based on the received data, the base station or external programmer device may adjust operating parameters for the IMD.

In general, the IMDs and external programmers or base stations communicate bi-directionally using the Medical Implant Communication Service ("MICS") specification. The MICS specification is defined under 47 C.F.R. 95.601-95.673 Subpart E (incorporated herein by reference) and ETSI EN 301 839-1 (incorporated herein by reference). The MICS protocol uses a frequency band between 402-405 MHz and a transmit power of approximately 25 microwatts.

Current external programmer and base station hardware is costly and cannot be upgraded without purchasing new equipment. Low cost off the shelf commercial goods, such as smart phones or tablet computers, currently cannot be used as a substitute. Off the shelf commercial goods are not equipped with MICS transceivers and are thus not capable of communicating bi-directionally with the IMD. Consequently, a need exits for a system that can enable off the shelf commercial goods to communicate with the IMD.

SUMMARY

In accordance with embodiments herein, a method is provided for a bridge device to interface between an external device and an implantable medical device ("IMD"), the bridge device includes a system on a chip ("SoC") having a memory, an input/output ("I/O") interface, a standard wireless computer network ("SWCN") controller and a bridge controller integrated into a single integrated circuit ("IC"). The method includes configuring the bridge controller to convert data between a Medical Implant Communication Service ("MICS") protocol and a SWCN protocol, coupling a MICS controller to the SoC, and configuring the MICS controller to manage operation of a first transceiver based on the MICS protocol. The method includes configuring the SWCN controller to manage operation of a second transceiver based on the SWCN protocol, communicating between the bridge device and an IMD utilizing the first transceiver, and communicating between the bridge device and an external device utilizing the second transceiver.

Optionally, the method may include configuring the bridge microcontroller and MICS controller to operate in a master and slave configuration.

Optionally, the method may include having the SWCN protocol is one of a Classic Bluetooth protocol, a Bluetooth Low Energy protocol, a ZigBee protocol, and a WiFi protocol.

Optionally, the method may include having the MICS controller further coupled to the second transceiver, the MICS controller and SWCN controller coordinating with one another such that at one point in time the second transceiver transmits data formatted based on the SWCN protocol and under control of the SWCN controller, and at a second point in time the second transceiver transmits data formatted based on the MICS protocol and under control of the MICS controller.

Optionally, the method may include an IC that integrates memory, an I/O interface, the SWCN controller and the bridge microcontroller into a SoC. The method may further have the SoC include an encryption circuit configured to perform encryption and decryption of the data transmitted and received by at least one of the first and second transceivers. The method may further have the IC include electrically erasable programmable read-only memory ("EEPROM").

Optionally, the method may include a housing that holds the first and second transceivers, MICS and SWCN controller, and the bridge microcontroller. The housing includes an attachment member configured to mechanically mount the bridge device on the external device.

In accordance with embodiments herein, a communication bridge is provided to interface between an external device and an implantable medical device ("IMD"). The communication bridge comprises a first transceiver configured to communicate with the IMD utilizing a Medical Implant Communications Service ("MICS") protocol, and a second transceiver configured to communicate with the external device utilizing a standardized wireless computer network ("SWCN") protocol. The communication bridge also comprises a MICS controller coupled to, and configured to manage operation of, the first transceiver based on the MICS protocol, a SWCN controller coupled to, and configured to manage operation of, the second transceiver based on the SWCN protocol, and a bridge microcontroller coupled to the MICS and SWCN controllers, the microcontroller configured to convert data between the MICS and SWCN protocols and to exchange the data to and from the MICS and SWCN controllers to provide a wireless bridge between the SWCN enabled external device and the IMD.

Optionally, the communication bridge may further comprise a serial peripheral interface ("SPI") bus interface and/or Inter-Integrated Circuit ("I2C") bus located between the MICS controller and the bridge microcontroller for conveying data to and from the MICS controller.

Optionally, the bridge microcontroller and MICS controller operate in a master and slave configuration.

Optionally, the communication bridge may further comprise a housing that holds the first and second transceivers, MICS and SWCN controllers, and the bridge microcontroller. The housing includes an attachment member configured to mechanically mount the communication bridge on the external device.

Optionally, the SWCN protocol is one of a Classic Bluetooth protocol, a Bluetooth Low Energy protocol, a ZigBee protocol, and a WiFi protocol.

Optionally, the MICS controller is further coupled to the second transceiver. Further, the MICS controller and SWCN controller coordinate with one another such that at one point in time the second transceiver transmits data formatted based on the SWCN protocol and under control of the SWCN controller, and at a second point in time the second transceiver transmits data formatted based on the MICS protocol and under control of the MICS controller.

Optionally, the communication bridge may comprise an integrated circuit ("IC") that integrates memory, an I/O interface, the SWCN controller, and the bridge microcontroller into a single system on a chip (SoC). The SoC may include an encryption circuit configured to perform encryption and decryption of the data transmitted and received by at least one of the first and second transceivers. Further the integrated circuit may include EEPROM memory.

BRIEF DESCRIPTION OF THE DRAWINGS

These and other features, aspects, and advantages will be more fully understood when considered with respect to the following detailed description, the appended claims, and the accompanying drawings.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals may be used to denote like features throughout the specification and figures.

DETAILED DESCRIPTION

The description that follows sets forth one or more illustrative embodiments. It will be apparent that the teachings herein may be embodied in a wide variety of forms, some of which may appear to be quite different from those of the disclosed embodiments. Consequently, the specific structural and functional details disclosed herein are merely representative and do not limit the scope of the disclosure. For example, based on the teachings herein one skilled in the art should appreciate that the various structural and functional details disclosed herein may be incorporated in an embodiment independently of any other structural or functional details. Thus, an apparatus may be implemented or a method practiced using any number of the structural or functional details set forth in any disclosed embodiment(s). Also, an apparatus may be implemented or a method practiced using other structural or functional details in addition to or other than the structural or functional details set forth in any disclosed embodiment(s).

Figure 1:
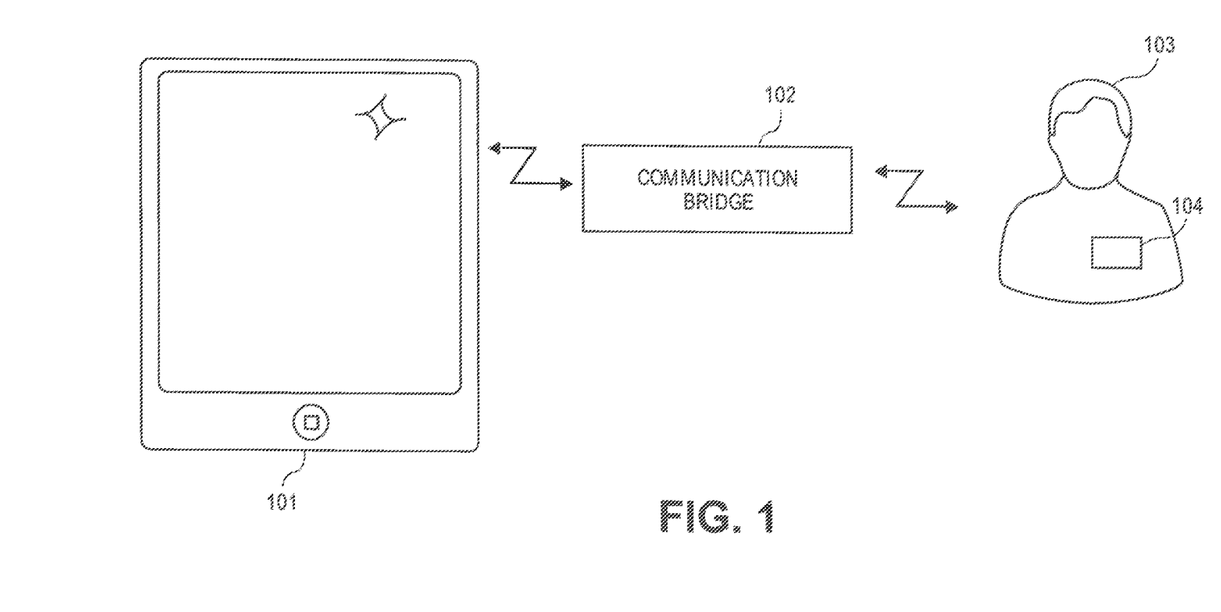
FIG. 1 illustrates a perspective view of an exemplary integrated system of an embodiment.

FIG. 1 illustrates a perspective view of an exemplary integrated system 100 of an embodiment. The exemplary integrated system 100 includes an external device 101 (e.g., tablet computer, personal computer, personal digital assistant, smart phone, portable media player, or the like) that interfaces with an implantable medical device ("IMD") 104 within a patient 103 using a communication bridge 102. The communication bridge 102 allows the external device 101 to communicate various information, such as sets of instructions and/or data to the IMD 104 even though the external device 101 and the IMD 104 utilize different communications protocols and thus cannot communicate directly with one another.

The external device 101 may be configured to establish a wireless bi-directional communication link only with devices that may use a select first protocol, such as a standard wireless computer network ("SWCN") protocol (e.g., Bluetooth, Bluetooth low energy, WiFi, ZigBee, and the like). The IMD 104 may only communicate using a select second protocol to establish a wireless bi-directional communication link, such as with the MICS protocol. A communication bridge 102 bridges (e.g., network bridging) the external device 101 and the IMD 104 together allowing the external device 101 and the IMD 104 to send and receive instructions and/or data between each other.

In one embodiment, optionally, the SWCN protocol may be a Bluetooth protocol. The Bluetooth protocol is defined within "Bluetooth Specification Version 4.0 [Vol 0], published Jun. 30, 2011 (incorporated herein by reference). The Bluetooth protocol is a master-slave protocol operating in a frequency range of 2400-2483.5 MHz (including guard bands). The frequency range is divided into 79 RF channels having a bandwidth of 1 MHz. For example, the first channel starts at 2402 MHz and continues up to 2480 MHz in 1 MHz increments. Data is transmitted into data packets at a basic rate of 1 Mbps or an enhanced data rate of 2 or 3 Mbps.

The basic rate may use data packets that include three entities: an access code, a header, and a payload. The access code includes 68-72 bits and has two functions. First, the access code identifies the data packet to a receiver of the data packet. Second, the access code contains a trigger signal that is used by the receiver for timing synchronization with the transmitter of the data packet. The header contains 54 bits used for link control information. The header is broken into six fields: a transport address (contains the destination address and the source address of the data packet); a type code (indicates the type of the data packet); flow control; an acknowledge indication (used to inform the source of a successful transfer); a sequence number (provides a sequential numbering scheme to order the data packet stream); and a header error check (provides a value to determine the integrity of the header). The payload of the data packet may contain 0-2745 bits. The data packet of the enhanced data rate includes three additional entities to the payload, a guard time, a synchronization sequence, and a trailer. The guard time is between 4.75-5.25 μsec, starting at the end of the header and ending at the start of the synchronization sequence. The synchronization sequence is 11 μsec long and includes a reference symbol. The trailer comprises two symbols added at the end of the payload.

Each device using the Bluetooth protocol is designated either as a master or a slave device. The master device has unidirectional control over one or more other devices (e.g., slave devices). Communication of the data packets between the master and slave devices is based off of time slots, formed from the clock of a master device, that are 625 μs in length. The data packets may be one, three, or five slots long but in all cases the master device transmission will begin in an even slot and the slave in an odd slot.

In at least one embodiment, optionally, the SCWCN protocol may be the Bluetooth Low Energy or BLE protocol. The BLE protocol is defined within the "Bluetooth Specification Version 4.0 [Vol 0](referenced above). Similar to the Bluetooth protocol, the BLE protocol is a master-slave protocol operating within a frequency range of 2400-2483.5 MHz (including guard bands). However, the BLE protocol uses 40 RF channels using a 2 MHz bandwidth. The 40 RF channels are allocated into two channel types, a data channel (having 37 channels) and an advertising channel (having 3 channels). The data channel is used by devices on a BLE network for communication between connected devices. The advertising channel is used by devices on the BLE network to discover new devices, initiating a connection, and broadcasting data. Each RF channel (data and advertising channel) is allocated a unique channel index, such that, if two devices wish to communicate, the transceivers of each device must be tuned to the same RF channel at the same time.

Data transmitted on the RF channels are grouped into data packets. The data packets are transmitted at 1 Mbps and include four entities, a preamble, an access address, a protocol data unit ("PDU"), and a cyclic redundancy check ("CRC"). The preamble contains 8 bits and is used by the receiver to perform frequency synchronization, symbol timing estimation, and automatic gain control training. The access address contains 32 bits. The access address for all advertising channel data packets is predetermined by the BLE protocol. The access address in data channel packets is generated by the device and is different for any two devices using the same data channel. The PDU contains a 16 bit header and a variable size payload. Optionally, the PDU for data channel data packets may contain a 32 bit Message Integrity Check field for use in encrypting data packets.

Each device using the BLE protocol is designated either as a master or a slave device. The BLE protocol does not limit the number of slave devices controlled or communicating with the master device. Once communication is established, the master and the slave alternate sending and receiving data packets during a connection event. The connection event may last between 7.5 ms to 4.0 s and beginning at an anchor point, when the master device transmits a data channel PDU to the slave device. Either the master or slave device may end the connection event.

In at least one embodiment, the SWCN protocol may be the WiFi protocol. The WiFi protocol is based on the Institute of Electrical and Electronics Engineers 802.11 standards (e.g., 802.11, 802.11a, 802.11b, 802.11g, 802.11n, or the like) defined under "Part 11: Wireless LAN Medium Access Control (MAC) and Physical Layer Specifications," IEEE Std 802.11™—2012 (incorporated herein by reference). The WiFi protocol may work in either the 2.4-2.5 GHz or 4.915-5.825 GHz frequency bands. The 2.4-2.5 GHz frequency band is divided into 14 channels spaced 5 MHz apart beginning with channel 1 centered on 2.412 GHz. A WiFi network may comprise stations in an ad hoc network or independent basic service set network configuration. In the ad hoc network each station communicates directly with each other in a peer-to-peer manner controlled independently of one another (unlike the master-slave configuration).

Data transmitted using the WiFi protocol is bundled into data packets. Each data packet comprises frames including a PHY preamble and header, a MAC header, a payload (frame body), and a frame check sequence. The PHY preamble and header contains information on the data rate and length of the data packet. The MAC header is 36 octets long and contains a frame control field, a duration ID, up to four address fields (source address, destination address, transmitting station address, and receiving station address), a sequence control field, a quality of service control field, and a high throughput control field. The frame control field is 16 bits long and is broken into 11 subfields (protocol version, type, subtype, to DS, from DS, more fragments, retry, power management, more data, protection frame, order) that contain control information used for defining the type of MAC frame and providing information necessary for the receiver to understand how to process the MAC frame. The duration ID is 16 bits long and is used for all control type frames, except with the subtype of power save poll, to indicate the remaining duration needed to receive the next frame transmission. When the sub-type is power save poll, the field contains the association identity of the transmitting station. The sequence control field is 16 bits long and includes two subfields a sequence number (indicates the sequence number for each frame) and a fragmentation number (indicates the number of each frame sent of a fragmented frame). The quality of service ("QoS") control field is a 16-bit field that identifies a traffic category or traffic stream to which the frame belongs as well as various other QoS-related information about the frame that varies by frame type, subtype, and type of transmitting station. The payload or frame body may be between 0-7951 bits long. Lastly, the frame check sequence is 36 bits long and is generated by the transmitting station using a cyclic redundancy check over all of the fields in the MAC header.

In at least one embodiment, the SWCN protocol may be a ZigBee protocol. The ZigBee protocol is defined under the "ZigBee Specification," ZigBee Document 053474r17, Jan. 17, 2008 (incorporated herein by reference), of which, is based on IEEE 802.15.4 defined under "IEEE Standard for Local and metropolitan area networks—Part 15.4: Low-Rate Wireless Personal Area Networks (LR-WPANs)", IEEE Std 802.15.4™—2011 (incorporated herein by reference). The ZigBee protocol may operate within a frequency band of 868-868.6 MHz ("868 MHz"), 902-928 MHz ("915 MHz"), or 2400-2483.5 MHz ("2.4 GHz"). The frequency bands are divided into channels, the 868 Mhz frequency band has one channel, the 915 MHz frequency band has 10 channels, and the 2.4 GHz frequency band has 16 channels. A ZigBee network is comprised of a coordinator as well as a router and/or end devices. The coordinator establishes and controls the ZigBee network, and allows other devices such as the router and/or end device to join the ZigBee network. The coordinator may form network links with routers and/or end devices. The router allows other devices such as other routers and/or end devices to join the ZigBee network and assist in routing data through the network (e.g., routing data from an end device to another end device). The router may form network links with other routers, the coordinator, and/or end devices. The end device may only communicate with the router or coordinator and is not allowed to join additional devices to the ZigBee network.

Data transmitted using the ZigBee protocol are bundled into data packets. Each data packet comprises frames including a synchronization header, a PHY header, a MAC header, a MAC service data unit, and a frame check sequence. The synchronization header is five octets long, and contains a preamble sequence to allow a receiver (e.g., end device, router) to acquire and synchronize to the incoming signal and a start of frame delimiter that signals the end of the preamble sequence. The PHY header is one octet long, and contains information on the length of the data packet. The MAC header is between 7-23 octets long and contains frame control fields, a data sequence number, and address information (destination identifier, source identifier, Destination IEEE address, Source IEEE address). The frame control field is two octets long and contains information defining the frame type (e.g., data packet), address field mode, and other control flags. The MAC service data unit contains network and application layer information for the data packet, and the payload for the receiver.

Figure 2:
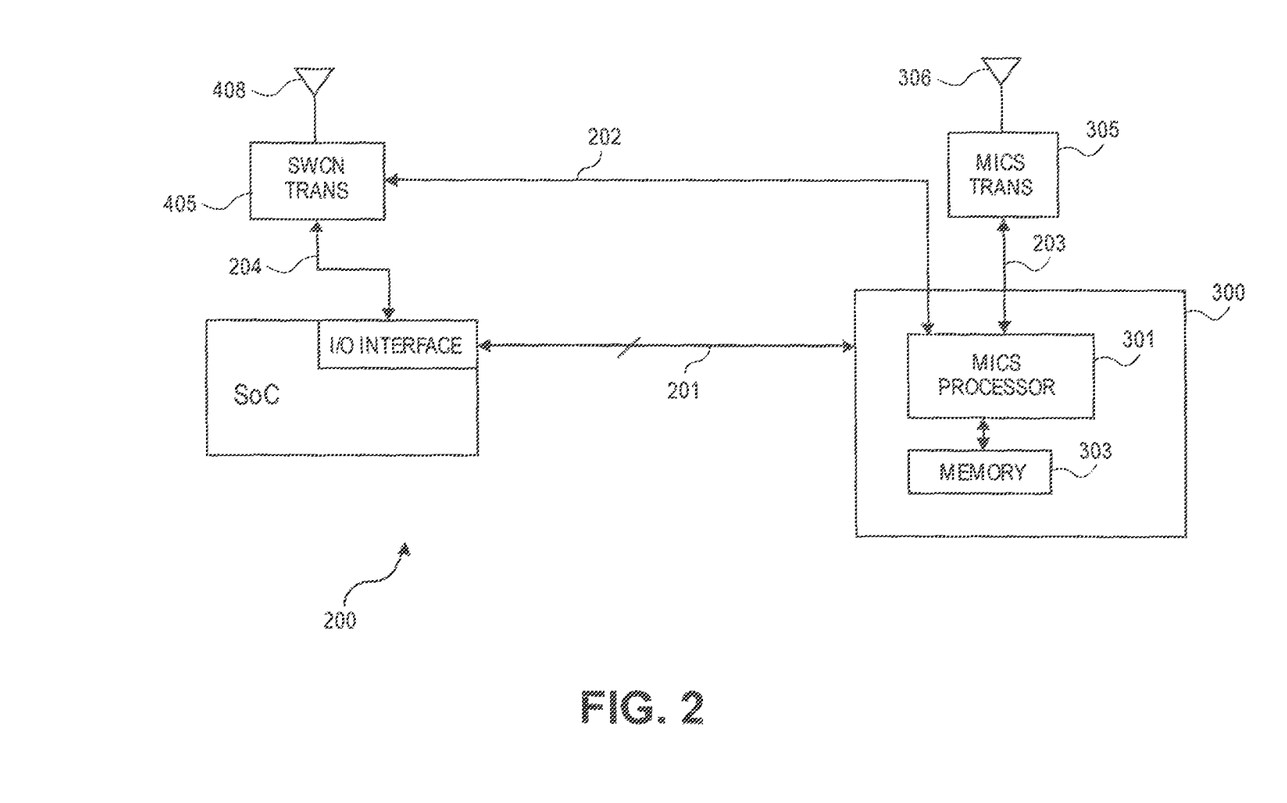
FIG. 2 is a simplified block diagram illustrating sample components for an embodiment of a communication bridge.

FIG. 2 illustrates a simplified block diagram of an embodiment of a communication bridge 200. The communication bridge 200 may include a system on a chip ("SoC") 400, a MICS controller 300, and two transceivers 305 and 405. The SoC 400 and the MICS controller 300 are coupled by a communication bus 201. The communication bus 201 may be a serial peripheral interface ("SPI") bus, an inter-integrated circuit ("I2C") bus, a USB, or the like. The SoC 400 is operatively coupled to the SWCN transceiver 405 by an SWCN transmission line 204. The MICS controller 300 is operatively coupled to the MICS transceiver 305 by a MICS transmission line 203. In an embodiment, the MICS controller 300 may also be operatively coupled to the SWCN transceiver 405 by a wake-up line 202. Each of the transceivers 305 and 405 are configured to communicate in accordance with different wireless protocols allowing the communication bridge 200 to send and receive data to/from different wireless protocol configured devices (SWCN protocol, MICS protocol).

The MICS protocol operates in the MICS band at 402-405 MHz. The MICS band is divided into 10 MICS channels each with a bandwidth of 0.3 MHz. All data transmitted on the MICS channels are grouped into data packets. The data packets may be transmitted at a rate of 200 kbps (2FSK-Fallback), 400 kbps (2FSK), or 800 kbps (4FSK). The data packets include a synchronization word, a packet header, and at least one data block. The synchronization word is a 40 bit long reference word used to inform the receiver of the data packet. The packet header is 130 bits long and contains protocol details (flow control information, packet acknowledgement, MICS channel information), a transceiver ID, a cyclic redundancy check ("CRC"), and a Reed-Solomon ("RS") block. The transceiver ID is a 24 bit code that identifies the implant and the company ID (8 bit unique company code). The packet header has a 24 bit CRC to detect for any errors arising from the data packet transmission and an RS code (30 bits) to correct any bit errors. The data blocks include 113 bits of effective data, 30 bits of RS error correcting code and a 12 bit CRC for error detection. The data packet can contain up to 31 data blocks.

FIG. 2 illustrates a simplified block diagram of an exemplary embodiment of the MICS controller 300. The MICS controller 300 controls the data communication between the MICS transceiver 305 and the application interface of the communication bus 201 using a MICS processor 301.

For example, the MICS controller 300 may determine whether to output the effective data of a MICS data packet, over the communication bus 201, received from the MICS transceiver 305. The MICS controller 300 may have the 40 bit synchronization word and a transceiver ID corresponding to the connected IMD (IMD 104) stored on a memory module 303 accessible or operatively coupled to the MICS processor 301. The MICS transceiver 305 receives a MICS transmission from the IMO 104, and outputs the transmission to the MICS processor 301. The MICS processor 301 may store the MICS transmission on the memory module 303 or a memory buffer for analysis. The MICS processor 301 may determine that the MICS transmission is a MICS data packet by analyzing the MICS transmission for a synchronization word that matches the stored synchronization word found on the memory module 303. When a matched synchronization word is found, the MICS processor 301 may analyze the packet header to determine the size of the MICS data packet to partition the different frames of the MICS data packet such as the data blocks and the transceiver ID of the IMD that transmitted the MICS transmission. If the MICS transmission does not include the stored synchronization word, the MICS processor 301 may ignore the MICS transmission.

The MICS processor 301 compares the transceiver ID with a transceiver ID that correlates to the IMD 104 to determine whether the MICS data packet is intended for the external device 101. If the transceiver ID matches that of IMD 104, the MICS processor 301 may perform an error detection by comparing the CRC code followed by any error correction using the RS codes. Afterwards, the MICS processor 301 removes the additional frames around the data block(s) (e.g., CRC codes, and RS codes) to isolate the effective data. Once isolated, the MICS processor 301 may output the effective data over the communication bus 201. If the transceiver ID does not match that of the IMD 104, the MICS processor 301 may ignore the MICS data packet.

Figure 3:
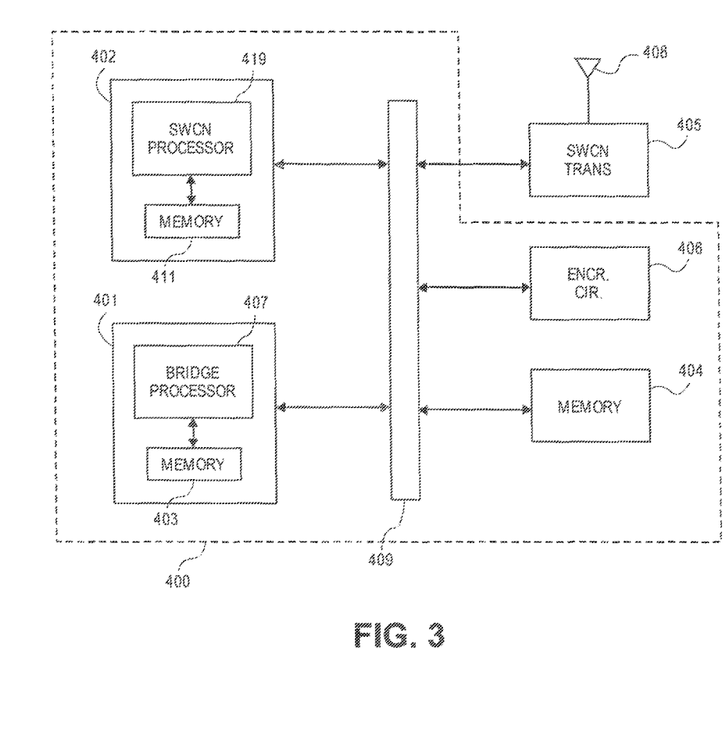
FIG. 3 is a simplified block diagram illustrating sample components for an embodiment of a system on chip.

Optionally, the effective data may be encrypted. The MICS processor 301 may output the encrypted data to an encryption circuit 406 through the communication bus 201 and I/O interface 409. The encryption circuit 406 is configured to encrypt and decrypt data transmitted and received by the MICS transceiver 305 and/or the SWCN transceiver 405. The encryption circuit 406 uses a predetermined encryption code, such as a 128 bit Advanced Encryption Standard, that is designated by the user and/or received by the external device 101. Once the effective data is decrypted, the encryption circuit 406 may output the decrypted effective data back to the MICS controller 300.

Additionally, the MICS controller 300 may convert data from the communication bus 201 to the MICS protocol for transmission to the IMD 104. The MICS controller 300 receives a MICS transmission instruction containing an intended payload for the IMD 104 over the communication bus 201. The MICS processor 301 recognizes the MICS transmit instruction and may store the intended payload on the memory module 303 or a memory buffer for compilation into a MICS data packet.

The MICS processor 301 determines the number of data blocks that are needed by partitioning the intended payload into 133 bit segments (the effective data). If the partitioning results in a segment of less than 133 bits the MICS processor 301 may add padded zeros (bit padding) to fill the segment to the required 133 bits. Any additional data blocks over the maximum allowed within the MICS data packet will be added to another MICS data packet by the MICS processor 301.

The MICS processor 301 assembles the MICS data packet by adding frames around the segments, such as, synchronous word, packet header, and error detecting CRC and RS codes. The synchronous word and RS codes may be predetermined by the user and stored on the memory module 303. A 12 bit CRC code may be calculated by the MICS processor 301 from the data blocks and another 24 bit CRC code from the data blocks and additional frames. For the packet header, the MICS processor 301 determines the overall bit size of the MICS data packet taking into account the number of data blocks and the transceiver ID for the IMD 104. The transceiver ID for the IMD 104 may be stored on the memory module 303 or within the transmission instructions received from the communication bus 201. Once the MICS data packet is assembled, the MICS processor 301 outputs the MICS data packet to the MICS transceiver 305. Additionally, the MICS processor 301 may include channel or frequency band instructions to the MICS transceiver 305 to transmit the MICS data packet.

FIG. 3 illustrates a simplified block diagram of an exemplary embodiment of the SoC 400 shown in FIG. 2. The SoC 400 may comprise a bridge controller 401, a SWCN controller 402, a memory module 404, an encryption circuit 406, and an input/output ("I/O") interface 409. The I/O interface 409 may manage the communications between the different internal components of the SoC 400 and other components connected to the communication bridge 200 (e.g, the MICS controller 300). The SoC 400 may be an integrated circuit ("IC") such that all components of the SoC 400 are on a single chip substrate (e.g., single silicon die, a chip). For example, the SoC 400 may have the bridge controller 401, the SWCN controller 402, the memory module 404, and the I/O interface 409 embedded on a single die contained within a single package (e.g., QFN, TQFP, SOIC, BGA, and the like).

Additionally or alternatively, the SoC 400 may comprise a plurality of chips (e.g., silicon dies, ICs) stacked within a single package. For example, the bridge controller 401 and the SWCN controller 402 are two different ICs. The ICs are stacked vertically on a substrate within a single package. Each IC is internally connected to each other and bonded by wire to the single package. Additionally or alternatively, the SoC 400 may represent a plurality of discrete integrated circuit packages (e.g., bridge controller 401, the SWCN controller 402, the memory module 404, the I/O interface 409) stacked vertically to reduce PCB area. For example, the bridge controller 401 and the SWCN controller 402 may each be in a ball grid array ("BGA") package which has interconnection pins along the bottom surface of the package. The BGA package of the SWCN controller 402 is coupled to the PCB, and has an extended substrate around the package. The bridge controller 401 is vertically stacked atop of the SWCN controller 402 having the interconnection pins of the bridge controller 401 coupled to the substrate. Thus the only PCB footprint is the BGA package of the SWCN controller 402.

The SWCN controller 402 controls the data communication between the SWCN transceiver 405 and the I/O interface using a SWCN processor 419. In an embodiment, the SWCN controller 402 may determine whether to partition and output the payload of a SWCN data packet, to the I/O interface 409, received from the SWCN transceiver 405 by analyzing the address fields of the SWCN data packet.

For example, the SWCN controller 402 may have the preambles for the BLE protocol and an access address for the external device 101 and communication bridge 200 stored on a memory module 411 operatively coupled to the SWCN processor 419. The SWCN transceiver 405 receives a BLE transmission from the external device 101, and outputs the BLE transmission to the I/O interface 409 for the SWCN processor 419. The SWCN processor 419 may store the BLE transmission on the memory module 411 or a memory buffer for analysis. The SWCN processor 419 may determine that the BLE transmission forms a BLE transmission packet by comparing the first 8 bits of the BLE transmission for the stored preamble found on the memory module 411. When the 8 bit preamble is found, the SWCN processor 419 may analyze the 32 bit (4 octets) access address to determine whether the BLE transmission originated from the external device 101, and/or that the BLE transmission is destined for the communication bridge 200 by comparing the access address to the stored access address on the memory module 411. If the access addresses do not match, the SWCN processor 419 may ignore the BLE transmission.

When the SWCN processor 419 determines the BLE packet is destined for the communication bridge 200, the SWCN processor 419 may perform a data de-whitening to avoid long sequences of zeros or ones in the BLE data packet by using a 7-bit linear feedback shift register. Afterwards, the SWCN processor 419 calculates a 24 bit CRC value from the PDU field of the BLE data packet. The SWCN processor 419 compares the CRC of the BLE data packet, the last 3 octets of the BLE data packet, to determine if any errors are present in the PDU. If the CRCs do not match the SWCN processor 419 may ignore the BLE data packet. After analyzing the header of the PDU to determine the size of the payload, the SWCN processor 419 may partition the payload from the BLE data packet and output to the I/O interface. Additionally, or alternatively, if the PDU is encrypted the SWCN processor 419 may output the PDU to the I/O interface to be decrypted by the encryption circuit 406 before the CRC may be calculated.

Additionally, the SWCN controller 402 may convert data received from the I/O interface 409 to a SWCN data packet by adding SWCN protocol segments to the data or payload. The SWCN controller outputs the SWCN data packet to the SWCN transceiver 405 which transmits the SWCN data packet to the external device 101.

For example, the SWCN controller 402 receives a BLE transmission instruction containing an intended payload for the external device 101 from the I/O interface 409. The SWCN processor 419 recognizes the BLE transmit instruction and may store the intended payload on the memory module 411 or a memory buffer for compilation into a BLE data packet.

The SWCN processor 419 determines the number of BLE data packets that are needed by partitioning the intended payload into segment lengths of less than or equal to 27 octets (216 bits). Any additional payload over the maximum allowed segment length may be added to another BLE data packet by the SWCN processor 419.

The SWCN processor 419 assembles the PDU of the BLE data packet by adding the header field to the payload. Optionally, the SCWN processor 419 may output the PDU to the I/O interface 409 to be encrypted by the encryption circuit 406. The SCWN processor 419 adds additional frames around the PDU, such as, the preamble, the access address, and a calculated CRC code. The preamble may be predetermined by the user and/or BLE protocol and stored on the memory module 411. For the calculated CRC code, the SWCN processor 419 calculates a 24 bit value from the PDU for possible error detection by the external device 101. The access address for the external device 101 and the communication bridge 200 may be stored on the memory module 411 or within the BLE transmission instructions received from the I/O interface 409. Once the BLE data packet is assembled the SWCN processor 419 outputs the BLE data packet to the I/O interface 409 to be received by the SWCN transceiver 405 for transmission. Additionally, the SWCN processor 419 may include channel or frequency band instructions to the SWCN transceiver 405 to transmit the BLE data packet.

As illustrated in FIG. 3, the bridge controller 401 operatively connects the SWCN controller 402 and the MICS controller 300 through the I/O interface and the communication bus 201. Additionally or alternatively, the bridge controller 401 may be coupled to the communication bus 201. The bridge controller 401 is configured to instruct and manage the data exchanged between the SWCN controller 402 and the MICS controller 300 thus providing a communication bridge between the external device 101 and the IMD 104.

In an embodiment, the bridge controller 401 instructs which SWCN data packets and MICS data packets are to be outputted by the SWCN controller 402 and the MICS controller 300 by providing the address fields or transceiver ID. For example, the SWCN processor 419 receives address fields from the I/O interface 409 originating from the bridge controller 401. The SWCN processor 419 stores the address fields onto the memory module 411. The SWCN controller 402 is configured to only output payloads of received SWCN data packets that have address fields (e.g., the header in the Bluetooth protocol, the access address for BLE protocol, address fields in the MAC header for WiFi and Zigbee protocols) matching the stored address fields on the memory module 411.

Additionally or alternatively, the SWCN controller 402 and the MICS controller 300 may be instructed by the bridge controller 401 to output the payload or effective data by sending or outputting the address field or transceiver ID to the bridge controller 401. For example, the MICS processor 301 receives a MICS data packet and determines the transceiver ID of the IMD that transmitted the MICS data packet. The MICS processor 301 may output the transceiver ID over the communication bus 201 to the bridge controller 401. When the transceiver ID is received, the bridge processor 407 may compare the transceiver ID with a stored transceiver ID on a memory module 403 operatively coupled to the bridge processor 407. If the transceiver IDs match, the bridge processor 407 may output an instruction to the MICS controller 300 over the communication bus 201 to respond back with the effective data of the MICS data packet.

SWCN protocols may require the external device 101 and the communication bridge 200 to perform a handshaking scheme. Handshaking schemes configure parameters that form the communication link between two devices, such as, the communication channel, exchange of network address, timing schemes, or the like. During the handshaking scheme, data may be communicated between the SWCN controller 402, the bridge controller 401, and the external device 101. Consequently, the SWCN controller 402 and the MICS processor 301 may output payloads or effective data that match the provided address fields and transceiver IDs of the bridge controller 401, but need not be communicated to the other device (the external device 101, the IMD 104). The bridge controller 401 manages the data exchanged between the SWCN controller 402 and the MICS processor 301 by determining what data should be transferred along the I/O interface 409 and communication bus 201 to the other controller for transmission.

For example, the external device 101 may need to form a BLE communication link with the communication bridge 200. The bridge controller 401 may instruct the SWCN controller 402 to create a BLE communication link with another device (e.g., the external device 101). The SWCN controller 402 instructs the SWCN transceiver to transmit a BLE advertisement packet along an advertisement channel. The BLE advertisement packet (similar to the BLE data packets described above) contains a preamble, an access address, a PDU, and the CRC. The preamble and access address are predetermined eight and 32 bit values that may be stored on the memory module 411 or within the transmit instruction of the bridge controller 401. The PDU of the BLE advertisement packet contains a 16 bit header and a variable sized payload. The payload contains the address field for the communication bridge 200. Optionally, the address field may be a predetermined value stored on the memory module 411 or within the transmit instructions of the bridge controller 401.

The external device 101 may respond to the BLE advertisement packet with a connection request using a BLE connection packet. The BLE connection packet contains a preamble, an access address, a PDU, and the CRC. The payload of the PDU includes communication parameters for the communication link with the communication bridge 200. The communication parameters include the access address of the external device 101, transmit timing windows, and usable data channels. The SWCN transceiver 405 receives the BLE connection packet, and outputs the packet to the I/O interface 409 for the SWCN controller 402. The SWCN processor 419 receives the BLE connection packet, and may store the packet on the memory module 411 or a memory buffer for partitioning the payload. The SWCN processor 419 partitions the payload from the PDU of the BLE connection packet and outputs the payload to the bridge processor 407 through the I/O interface 409.

The bridge processor 407 may determine from the contents of the payload, such as the transmit window and channel information, that the payload is for forming a communication link and not for programming or sending requests to the IMD 104. Thus, the bridge processor 407 may not transfer the payload to the MICS processor 301 using the communication bus 201. Rather, the bridge processor 407 may store the access address on the memory module 403 or instruct the SWCN processor 419 to store the access address on the memory module 411. The bridge processor 407 may send an instruction to the SWCN processor 419 to enter into a slave mode configuration. Thus the SWCN controller 419 will wait to receive a data packet from the external device 101.

The external device 101 transmits a measurement request within the payload of a BLE data packet on the data channel to the communication bridge 200. The BLE data packet is received by the SWCN transceiver 405 and outputted to the I/O interface 409 to be received by the SWCN controller 402. The payload is partitioned from the BLE data packet by the SWCN processor 419 and is sent to the I/O interface 409 to be received by the bridge controller 401. The bridge processor 407 may store the payload on the memory module 403 or on a memory buffer for analysis. The memory module 403 may further contain instruction and measurement codes used for the IMD 104. The bridge processor 407 may compare the payload with the instruction and measurement codes stored on the memory module 403 to determine whether the payload should be sent to the MICS controller 300. When the measurement request is matched with the stored measurement code on the memory module 403, the bridge processor may output the payload with transmit instructions to the MICS controller 300 over the communication bus 201.

Additionally or alternatively the bridge controller 401 may operate the MICS controller 300 in a master-slave configuration defined by the protocol of the communication bus 201. Under the master-slave configuration, the bridge controller 401 has unidirectional control over the MICS controller 300.

In an embodiment, the communication bus 201 may be a SPI bus. The SPI bus is a four wire bus having a clock output (from the master), a master output (slave input), a master input (slave output), and a slave select. The bridge controller 401, as the master, initiates data communication (sending instructions or payloads, reading effective data) by driving the slave select to the MICS controller 300 low and initiating a clock signal along the clock output.

For example, the bridge controller 401 may output a payload to the MICS controller 300. The bridge controller 401 drives the slave select low, and initiates a 4 MHz clock signal along the clock output. On the rising edge of the clock signal, the bridge controller 401 sends out a write instruction with the payload bits so the MICS controller 300 can sample the bits on the rising edge of the clock signal. Additionally or alternative, the bridge controller 401 may send a request to the MICS controller 300 for measurements received from the IMD 104. The bridge controller 401 drives the slave select low, and initiates a 4 MHz clock signal along the clock output. On the rising edge of the clock signal, the bridge controller 401 sends out a read instruction with the request bits so the MICS controller 300 can sample the bits on the rising edge of the clock signal to respond to the request.

In an embodiment, the MICS controller 300 may be operatively coupled (e.g., the wake-up line 202) to the SWCN transceiver 405 allowing the MICS controller 300 to transmit or communicate a wake-up signal to the IMD 104 over an SWCN frequency signal. An IMD may enter into a sleep mode by turning off a MICS transceiver of the IMD to conserve battery power. The IMD may exit the sleep mode once a wake-up signal of an external device is detected by a wake up system on the IMD. The wake up system may be able to detect an on-off key ("OOK") modulation scheme. The detection of the OOK modulation allows the IMD to detect high power signals without the need for a local oscillator and synthesizer in the receiver. Thus, an SWCN frequency signal, at around 2.45 GHz, may be used by the MICS controller 300 to wake up the IMD 104.

For example, the bridge processor 407 receives a payload originating from the external device 101 to form a communication link. The bridge processor 407 instruct the MICS controller 300 over the communication bus 201 to initiate a communication link with the IMD 104. The bridge processor 407 further instructs the SWCN controller 402 to cease outputting to the SWCN transceiver 405. The MICS processor 301 receives the instructions and forms a wake-up data signal packet for the IMD 104. The wake-up signal packet includes three fields, a start sequence (informs the IMD 104 of the packet), a company and transceiver ID, and a channel setup. The company and transceiver ID may be stored on the memory module 303 or received by the MICS processor 301 within the instructions from the bridge processor 407. The channel setup contains the MIC channel information, modulation modes, and address data to form a communication link between the IMD 104 and the communication bridge 200. The channel information may be stored on the memory module 303, or the cleanest channel parameters determined by the MICS processor 301 by monitoring MICS channels through the MICS receiver 305. Optionally, the channel information may be predetermined by user input from the external device 101.

Once the wake-up signal packet is formed, the MICS processor 301 may output the wake-up signal packet to the SWCN transceiver 405 using the wake-up line 202. The MICS controller 300 may monitor the MICS transceiver awaiting a confirmation signal from the IMD 104 over the MICS channel. Once the MICS controller 300 receives confirmation of a communication link with the IMD 104, the MICS controller 300 may inform or output to the bridge controller 401 that communication with the IMD 104 is established. Additionally or alternatively, the MICS controller may re-transmit the wake-up signal under the MICS protocol if the IMD 104 does not respond to the wake-up signal under the SWCN protocol.

Figure 4:
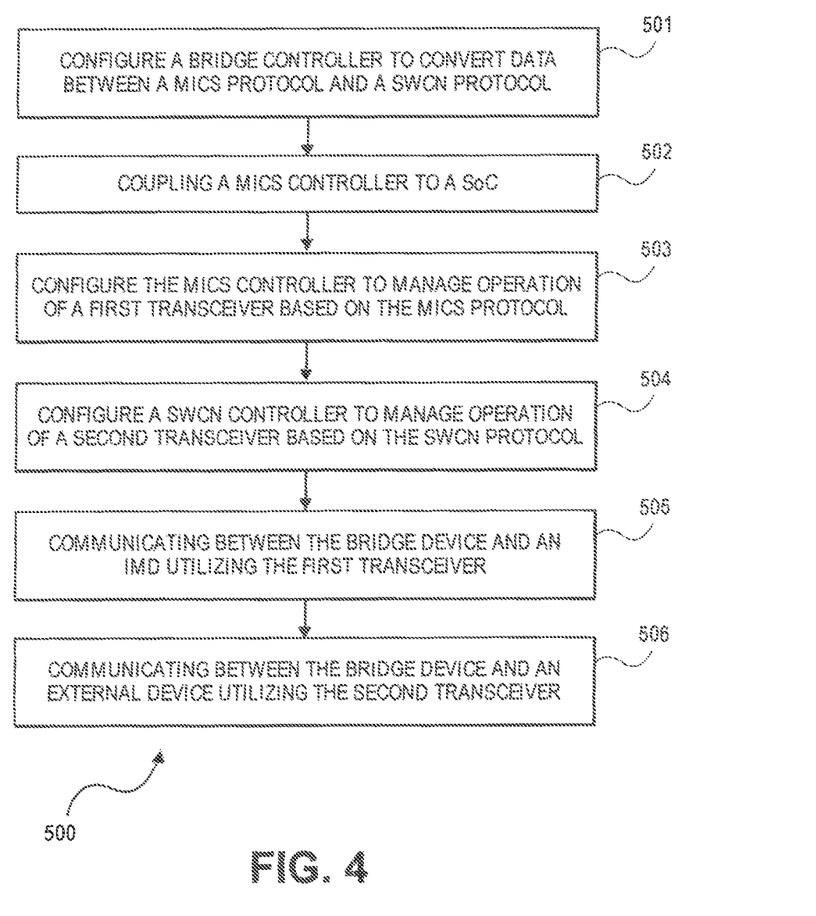
FIG. 4 is a flowchart of a method for providing a bridge device to interface between an external device and an implantable medical device.

FIG. 4 illustrates a flowchart of a method 500 for providing a bridge device to interface between an external device and an implantable medical device. The method 500 may be implemented as a software algorithm, package, or system that directs one or more hardware circuits or circuitry to perform the actions described herein. For example, the operations of the method 500 may represent actions to be performed by one or more circuits that include or are connected with processors, microprocessors, controllers, microcontrollers, Application Specific Integrated Circuits (ASICs), Field-Programmable Gate Arrays (FPGAs), or other logic-based devices that operate using instructions stored on a tangible and non-transitory computer readable medium (e.g., a computer hard drive, ROM, RAM, EEPROM, flash drive, or the like), such as software, and/or that operate based on instructions that are hardwired into the logic of the. At least one technical effect of at least a portion of the methods described herein includes the creation of a bridge device that interfaces between an external device and an implanted medical device ("IMD"), the bridge device includes a system on a chip ("SoC") having a memory, an I/O interface, a SWCN controller, and a bridge controller integrated into a single integrated circuit ("IC").

At 501, the method configures a bridge controller to convert data between a MICS protocol and a SWCN protocol. For example, the bridge controller 401 (FIG. 2) may be operatively coupled to the SWCN controller 402 and the MICS controller 300. The SWCN controller 402 may receive a SWCN data packet, and output the SWCN data packet to the bridge controller 401. The bridge processor 407 may store the SWCN data packet in the memory module 403. The bridge processor 407 may analyze the SWCN data packet and convert the data into a MICS data packet. The bridge processor 407 may output or communicate the MICS data packet to the MICS controller 300 to be transmitted under the MICS protocol.

At 502, the method couples a MICS controller to a SoC. For example, the SoC 400 is operatively coupled to the MICS controller 300 via the communication bus 201. At 503, the method configures the MICS controller to manage operation of a first transceiver based on the MICS protocol. For example, the MICS controller 300 is operatively coupled to the MICS transceiver 305, and relays the data transmitted/received through the MICS transceiver 305, and directs the data to either the SoC 400 or transmits data using the MICS transceiver 305.

At 504, the method configures a SWCN controller 402 to manage operation of a second transceiver based on the SWCN protocol. For example, the SWCN controller 402 relays the data transmitted/received through the SWCN transceiver 405 and directs the data to either the bridge controller 401 or transmits data using the SWCN protocol to the external device 101.

At 505, the method communicates between the bridge device 102 and an IMD 104 utilizing the first transceiver 305. And at 506, the method communicates between the bridge device 102 and an external device 101 utilizing the second transceiver 405. For example, the bridge device (e.g., the communication bridge 200) communicates a request based on the MICS protocol using the MICS transceiver 305 to the IMD 104. The IMD 104 may respond by transmitting measurement data to the bridge device (e.g., the communication bridge 200). The measurement data may be received by the MICS transceiver 305. The measurement data may be converted by the bridge controller 401 from the MICS protocol to the SWCN protocol. The bridge device (e.g., the communication bridge 200) may transmit the measurement data based on the SWCN protocol using the SWCN transceiver 405 to the external device 101.

The MICS transceiver 305 and the SWCN transceiver 405 may include or represent an antenna 306 and 408 respectively.

The MICS processor 301, the bridge processor 407, the SWCN processor 419, and the encryption circuit 406 may include or represent hardware circuits or circuitry that include and/or are connected with one or more logic based devices, such as processors, microprocessors, controllers, microcontrollers, or other logic based devices (and/or associated hardware, circuitry, and/or software stored on a tangible and non-transitory computer readable medium or memory).

The memory modules 303, 403, 404, and 411 may include or represent one or more memories (e.g., a tangible and non-transitory computer readable memory, such as a computer hard drive, EEPROM, ROM, RAM, or the like) having a table, list, database, or other memory structure used to store information used in conjunction with performing one or more of the methods described herein.

In an embodiment, the communication bridge 102 may be encased in a separate housing that is configured to mount (e.g., mechanically mounted, coupled, physically connected, or the like) to the external device 101. The communication bridge 102 may be powered by the external device 101 through a physical connector.

One or more of the operations described above in connection with the methods may be performed using one or more processors. The different devices in the systems described herein may represent one or more processors, and two or more of these devices may include at least one of the same processors. In one embodiment, the operations described herein may represent actions performed when one or more processors (e.g., of the devices described herein) are hardwired to perform the methods or portions of the methods described herein, and/or when the processors (e.g., of the devices described herein) operate according to one or more software programs that are written by one or more persons of ordinary skill in the art to perform the operations described in connection with the methods.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

In some embodiments, code including instructions (e.g., software, firmware, middleware, etc.) may be executed on one or more processing devices to implement one or more of the described functions or components. The code and associated components (e.g., data structures and other components used by the code or used to execute the code) may be stored in an appropriate data memory that is readable by a processing device (e.g., commonly referred to as a computer-readable medium).

The components and functions described herein may be connected or coupled in many different ways. The manner in which this is done may depend, in part, on whether and how the components are separated from the other components. In some embodiments some of the connections or couplings represented by the lead lines in the drawings may be in an integrated circuit, on a circuit board or implemented as discrete wires or in other ways.

What is claimed is:

1. A communications bridge to interface between an external device and an implantable medical device (IMD), the bridge comprising:
   a first transceiver configured to communicate with the IMD utilizing a Medical Implant Communications Service (MICS) protocol;
   a second transceiver configured to communicate with the external device utilizing a standardized wireless computer network (SWCN) protocol;
   a MICS controller coupled to, and configured to manage operation of, the first transceiver based on the MICS protocol;
   a SWCN controller coupled to, and configured to manage operation of, the second transceiver based on the SWCN protocol; and
   a bridge microcontroller coupled to the MICS and SWCN controllers, the microcontroller configured to convert data between the MICS and SWCN protocols and to exchange the data to and from the MICS and SWCN controllers to provide a wireless bridge between the SWCN enabled external device and the IMD.

2. The communication bridge in claim 1, further comprising a serial peripheral interface (SPI) bus interface located between the MICS controller and the bridge microcontroller for conveying data to and from the MICS controller.

3. The communications bridge of claim 2, wherein the bridge microcontroller and MICS controller communicate over the SPI bus interface in a master and slave configuration.

4. The communication bridge in claim 1, wherein the bridge microcontroller and MICS controller operate in a master and slave configuration.

5. The communication bridge in claim 1, further comprising a housing that holds the first and second transceivers, MICS and SWCN controllers, and the bridge microcontroller, wherein the housing includes an attachment member configured to mechanically mount the communication bridge on the external device.

6. The communication bridge in claim 1, wherein the SWCN protocol is one of a Classic Bluetooth protocol, a Bluetooth Low Energy protocol, a ZigBee protocol, and a WiFi protocol.

7. The communication bridge in claim 1, wherein the MICS controller is further coupled to the second transceiver, the MICS controller and SWCN controller coordinating with one another such that at one point in time the second transceiver transmits data formatted based on the SWCN protocol and under control of the SWCN controller, and at a second point in time the second transceiver transmits data formatted based on the MICS protocol and under control of the MICS controller.

8. The communications bridge of claim 1, further comprising an integrated circuit (IC) that integrates memory, an input/output interface, the SWCN controller and the bridge microcontroller into a single system on a chip (SoC).

9. The communication bridge in claim 8, wherein the SoC includes an encryption circuit configured to perform encryption and decryption of the data transmitted and received by at least one of the first and second transceivers.

10. The communication bridge in claim 1, wherein the integrated circuit includes EEPROM memory.

11. The communications bridge of claim 1, wherein the MICS controller is configured to analyze incoming MICS data packets by comparing synchronization information within the MICS data packets with synchronization information stored in the memory.

12. The communications bridge of claim 1, wherein the MICS controller directs the SWCN controller to transmit a wake-up signal to the IMD from the second transceiver utilizing the SWCN protocol.

13. A method for providing a bridge device to interface between an external device and an implantable medical device (IMD), the bridge device including a system on a chip (SoC) having a memory, an input/output interface, a SWCN controller and a bridge controller integrated into a single integrated circuit (IC); the method comprising:
   configuring the bridge controller to convert data between a Medical Implant Communications Service (MICS) protocol and a standardized wireless computer network (SWCN) protocol;
   coupling a MICS controller to the SoC, the MICS controller configured to manage operation of a first transceiver based on the MICS protocol;
   configuring the SWCN controller to manage operation of a second transceiver based on the SWCN protocol;
   communicating between the bridge device and an IMD utilizing the first transceiver; and
   communicating between the bridge device and an external device utilizing the second transceiver.

14. The method in claim 13, further comprising configuring the bridge microcontroller and MICS controller to operate in a master and slave configuration.

15. The method in claim 13, wherein the SWCN protocol is one of a Classic Bluetooth protocol, a Bluetooth Low Energy protocol, a ZigBee protocol, and a WiFi protocol.

16. The method in claim 13, wherein the MICS controller is further coupled to the second transceiver, the MICS controller and SWCN controller coordinating with one another such that at one point in time the second transceiver transmits data formatted based on the SWCN protocol and under control of the SWCN controller, and at a second point in time the second transceiver transmits data formatted based on the MICS protocol and under control of the MICS controller.

17. The method in claim 13, wherein the SoC includes an encryption circuit configured to perform encryption and decryption of the data transmitted and received by at least one of the first and second transceivers.

18. The method in claim 13, wherein the integrated circuit includes EEPROM memory.

19. The method in claim 13, further comprising a housing that holds the first and second transceivers, MICS and SWCN controllers, and the bridge microcontroller, wherein the housing includes an attachment member configured to mechanically mount the bridge device on the external device.

* * * * *